UNITED STATES PATENT OFFICE.

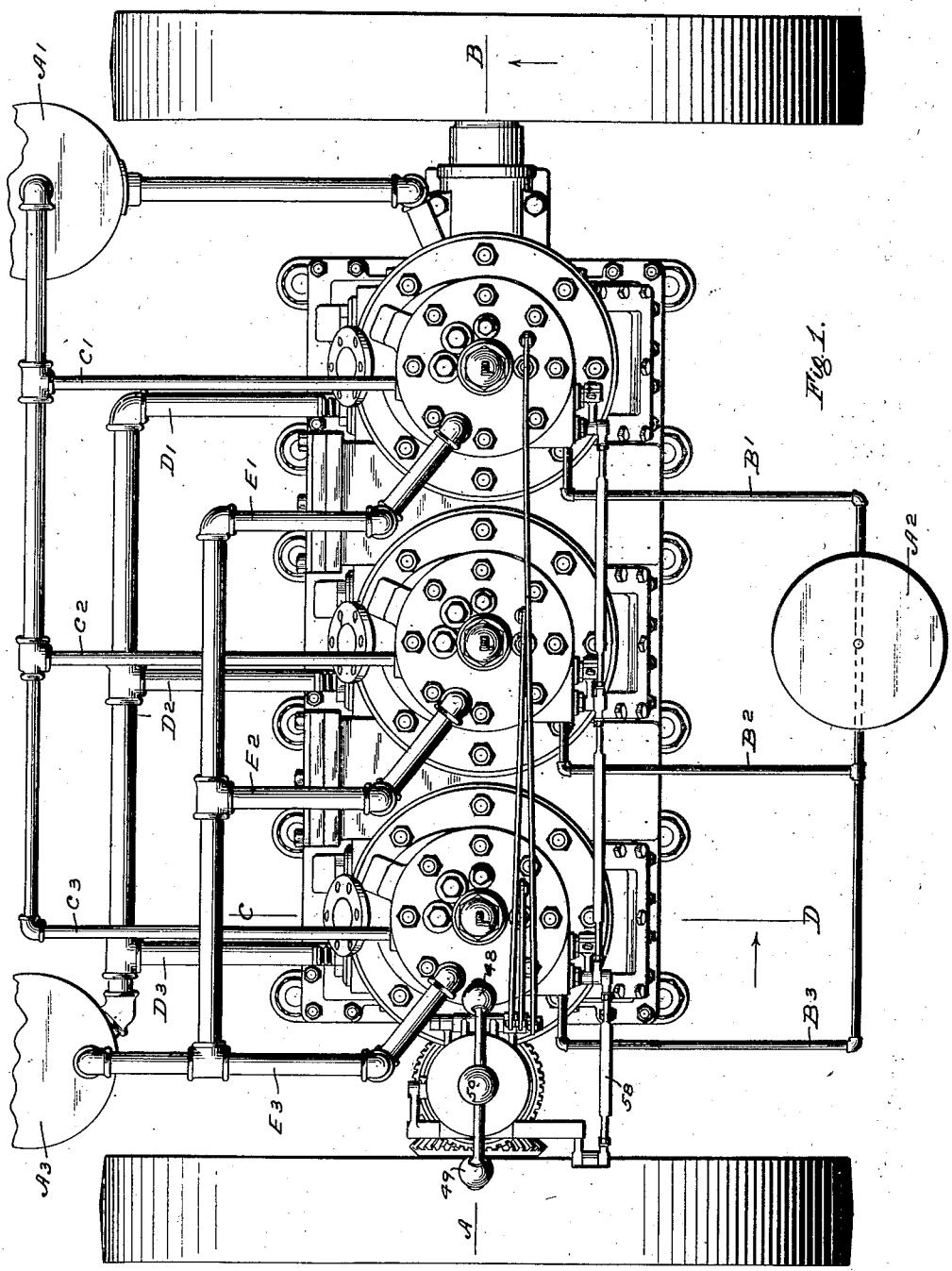

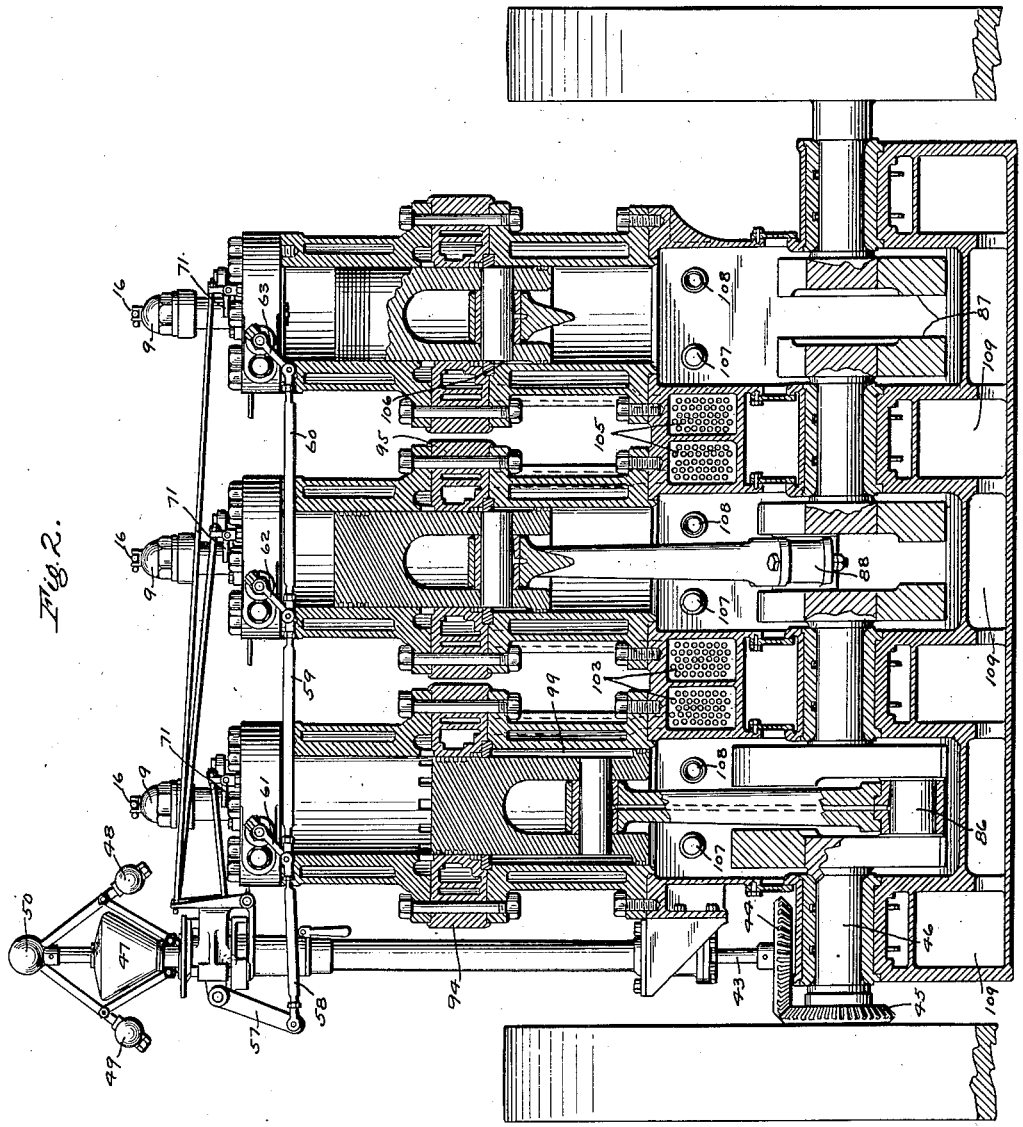

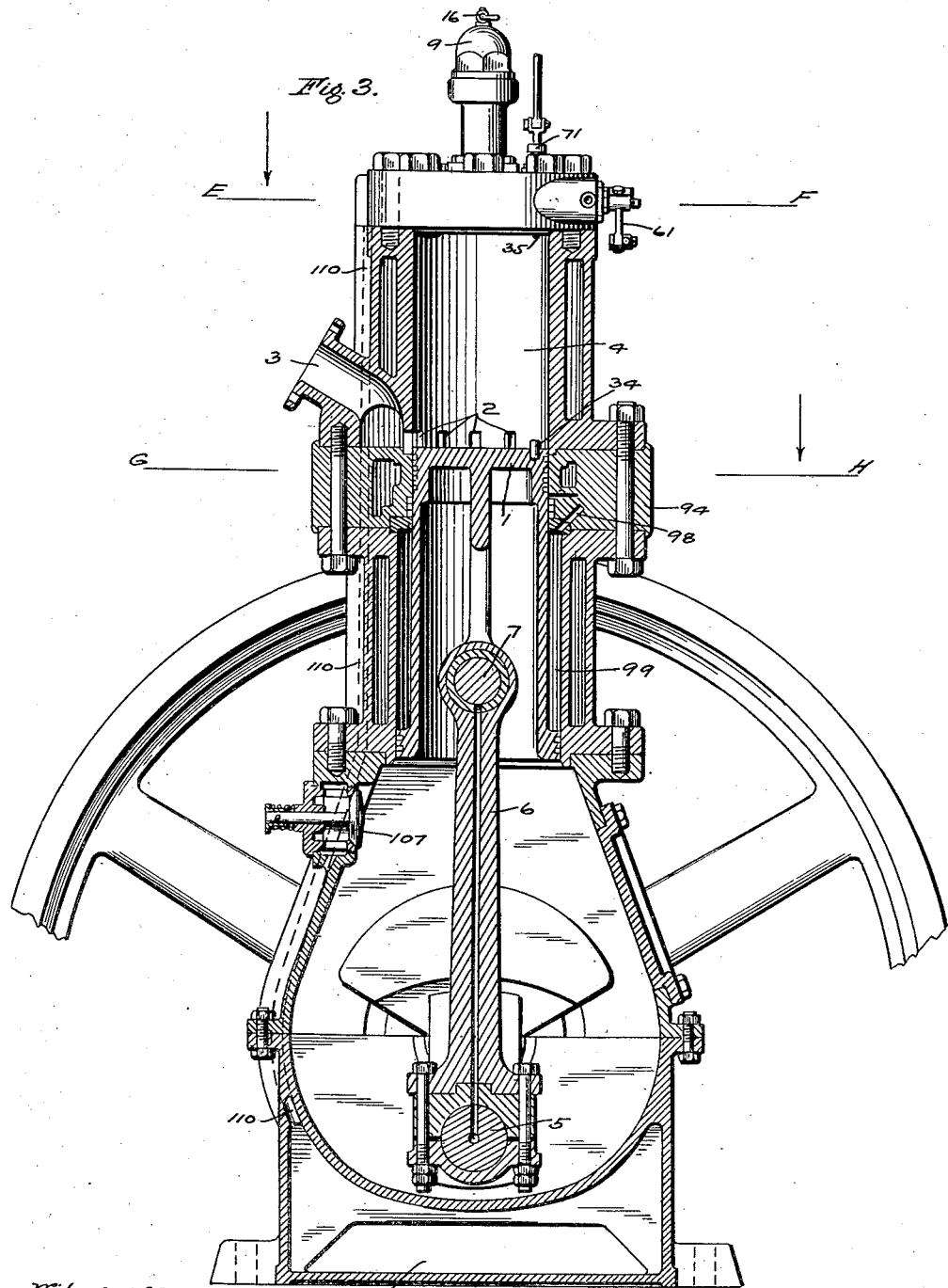

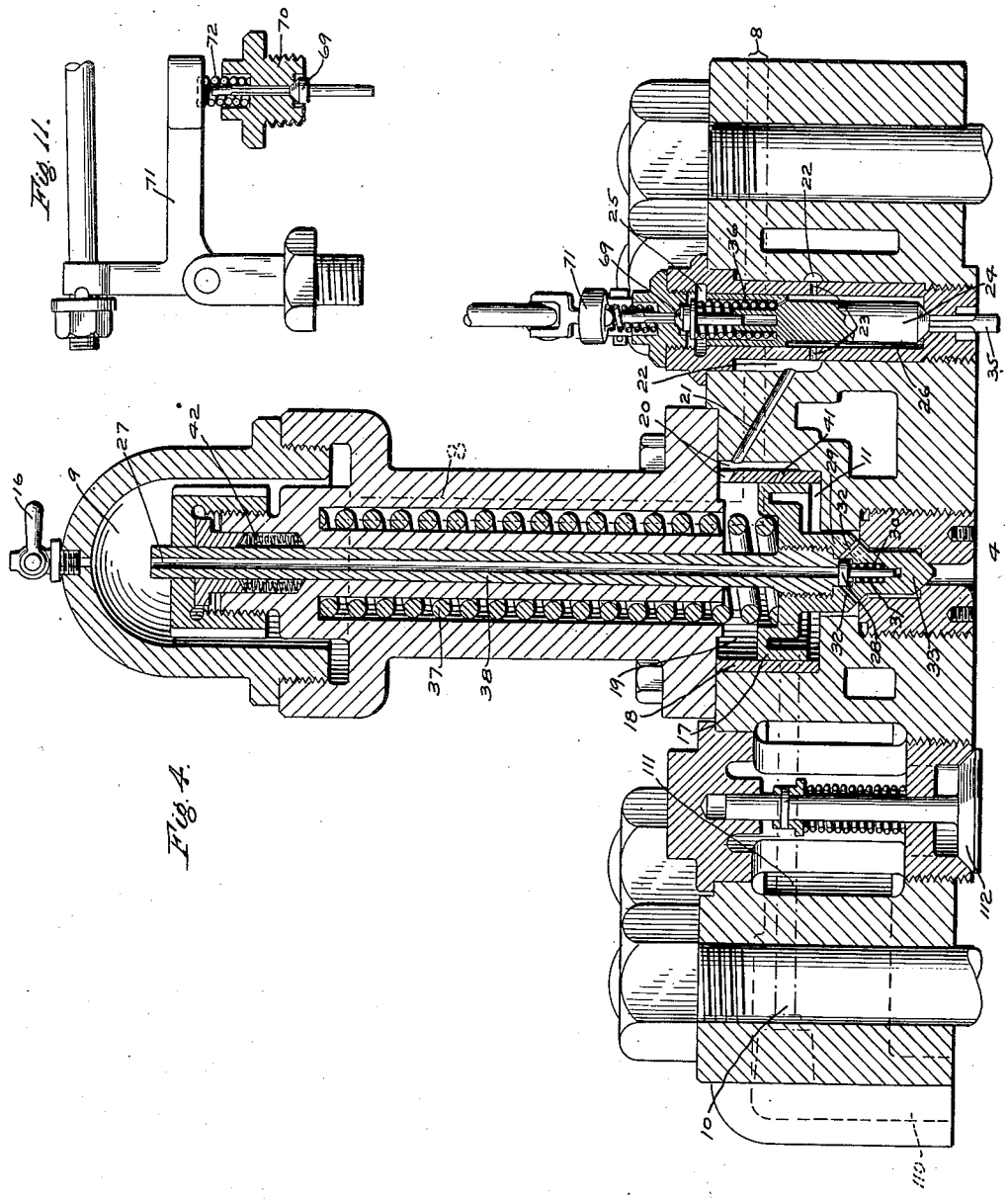

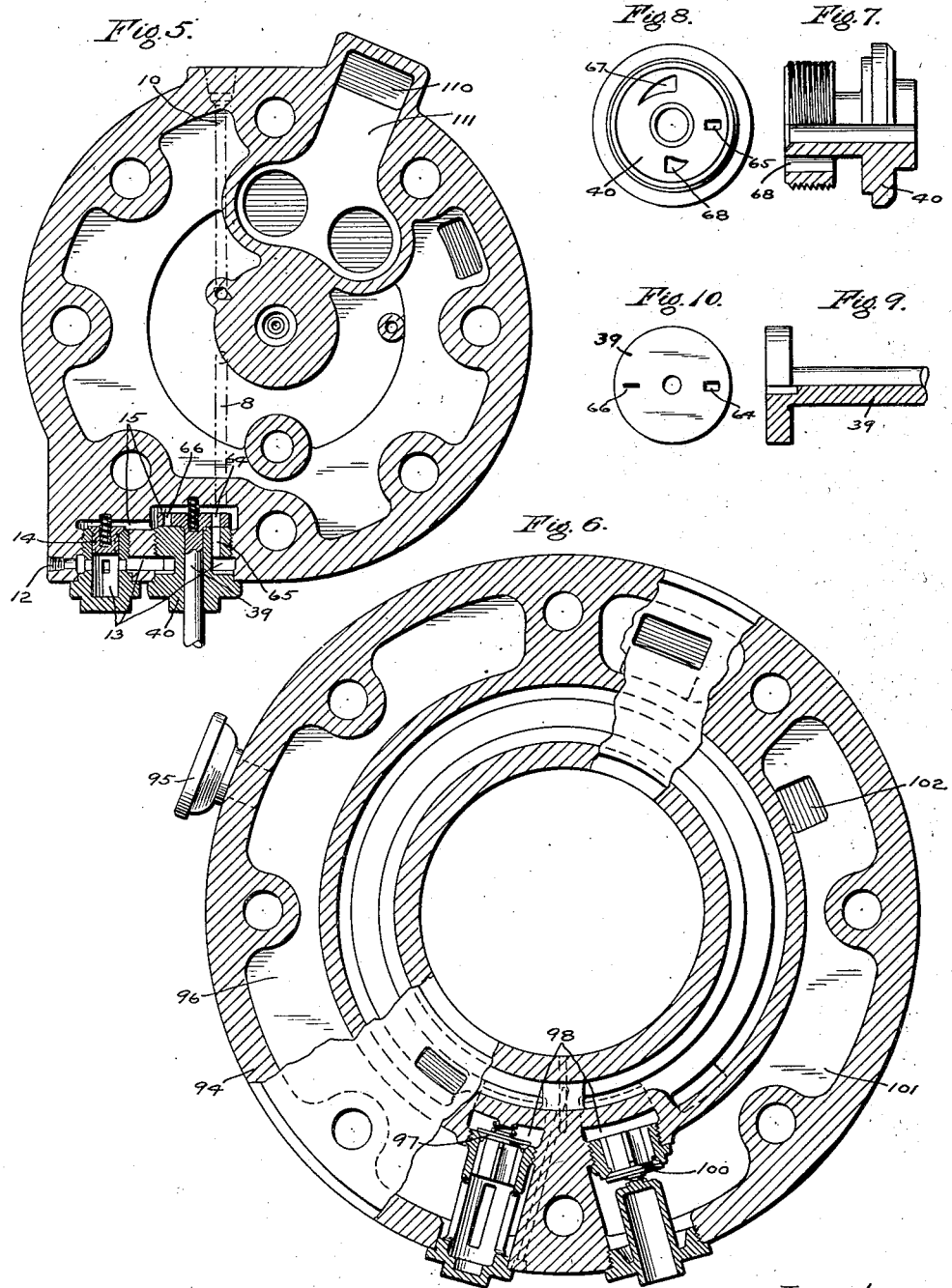

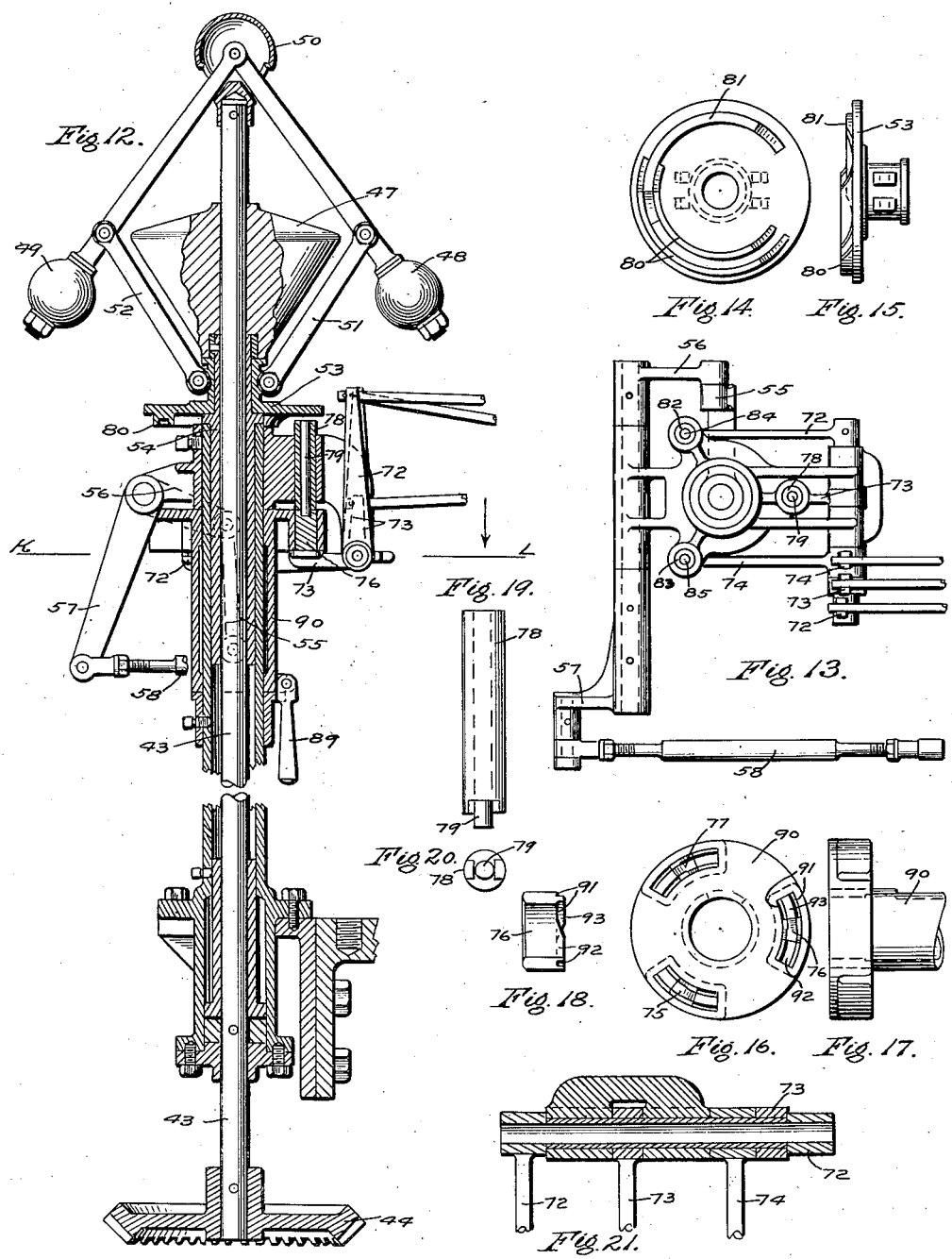

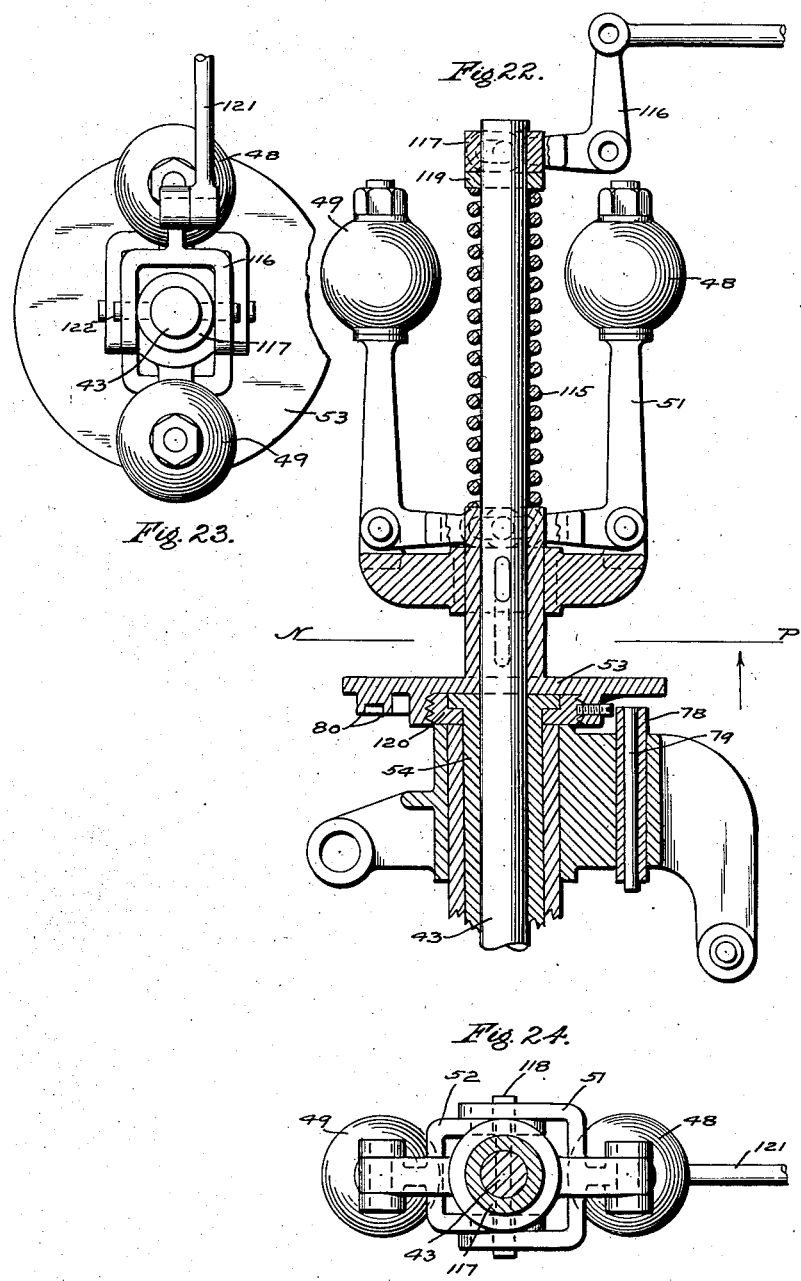

HERBERT T. HERR, OF DENVER, COLORADO.

INTERNAL-COMBUSTION ENGINE.

1,097,021. Specification of Letters Patent. Patented May 19, 1914.

Application filed May 14, 1908. Serial No. 432,881.

*To all whom it may concern:*

Be it known that I, HERBERT T. HERR, a citizen of the United States, residing at Denver, in the county of Denver and State of Colorado, have invented new and useful Improvements in Internal-Combustion Engines, of which the following is a specification.

This invention relates in general to internal combustion engines, and some of the features more particularly to engines of the Diesel type in which the charge of air or gas supplied to the cylinder is compressed by the movement of the piston into a small clearance space, at a sufficiently high pressure and temperature to spontaneously ignite the fuel oil which is, at the proper moment, injected into the cylinder, and thereby produce the desired combustion.

One of the objects of my invention is to provide an engine of this type having an injection of fuel and an explosion or combustion at each out stroke of the piston, that is, a two-cycle construction.

Another object is to provide an improved fuel injecting mechanism operated by fluid pressure and adapted to be applied to either two-cycle or four-cycle engines.

Another object is to provide an improved fuel injecting valve mechanism operated by the engine piston.

Another object is to provide improved means operating in connection with the fuel injecting mechanism, for governing the amount of fuel supplied according to the speed of the engine.

Another object is to provide an improved starting device operating in connection with a source of fluid pressure for automatically starting the engine.

Another object is to provide a speed governed mechanism for controlling the operation of the starting device.

Another object is to provide means operating in connection with the starting device and speed goverened mechanism for admitting the fluid pressure for automatically starting the engine, but at the same time prevent the admission of fuel until the engine attains a certain speed.

Another object is to provide a reversing mechanism operating in connection with the starting device and adapted to be manually adjusted to determine the direction in which the engine shall run.

In the accompanying drawings, which illustrate one form of an internal combustion engine embodying the several features of my improvements, Figure 1 is a plan view of a 3-cylinder 2-cycle engine; Fig. 2 a vertical longitudinal section of the same taken on the line A—B of Fig. 1, and looking in the direction of the arrow; Fig. 3 a transverse section taken on the line C—D of Fig. 1, and looking in the direction of the arrow; Fig. 4 a section of the cylinder head taken on line C—D of Fig. 1, and showing the same upon a larger scale; Fig. 5 a horizontal section of the cylinder head taken on line E—F of Fig. 3, and looking in the direction of the arrow; Fig. 6 a horizontal section of the intermediate head taken on line G—H of Fig. 3, and looking in the direction of the arrow; Fig. 7 a half elevation and half section of the controlling valve seat; Fig. 8 an inverted plan of the controlling valve seat, showing the ports; Fig. 9 a half elevation and half section of the controlling valve; Fig. 10 an inverted plan of the controlling valve; Fig. 11 an elevation and partial section showing a portion of the starting valve device; Fig. 12 a vertical section of the governing and starting valve devices; Fig. 13 a plan of a portion of the starting device; Fig. 14 an inverted plan of the cam-operating mechanism of the starting device; Fig. 15 an elevation of the latter; Fig. 16 a plan of the reversing plate and cams of the starting device; Fig. 17 an elevation of the latter; Fig. 18 an elevation of the starting device cam; Fig. 19 an elevation of the starting device plungers; Fig. 20 an inverted plan of same; Fig. 21 a section of the starting valve device levers and supports, taken on line K—L of Fig. 12 and looking in the direction of the arrow; Fig. 22 a vertical section of a portion of the governing and starting devices, showing a modification; Fig. 23 a plan view of the same; and Fig. 24 a horizontal section of the same taken on the line N—P of Fig. 22 and looking in the direction of the arrow.

According to the construction shown, my invention is illustrated as applied in connection with a 3-cylinder engine, each cylinder 4 containing a piston 1 connected by a rod 6 to a crank 5, on the shaft 46, the cranks being arranged at an angle of 120° with each other.

Referring to Fig. 3: The piston 1 is shown at the end of the stroke, with exhaust ports 2 opening into exhaust passage 3, the latter communicating with the atmosphere. In the position of the piston as shown, pure air will be contained in cylinder 4. Assuming the engine to rotate in the direction of the arrow, piston 1 will rise by the rotation of crank pin 5, transmitting its motion from connecting rod 6 to piston pin 7. When piston 1 has passed by exhaust ports 2, the air contained in cylinder 4 will be compressed by the upward movement of the piston into the clearance space which will obtain in the cylinder when crank 5 is on the opposite center from that shown in the drawing. It may be assumed, for the sake of description, that the relative volumes in the cylinder from the point of the piston closing exhaust ports 2 up to its point of reaching the dead center, compressing the air into the clearance space, are such that the compression stroke will raise the air pressure in the clearance space to say 500 pounds per square inch, at the same time raising its temperature corresponding nearly to that of adiabatic compression. At or near the dead center, if the fuel, such as kerosene oil, is injected into the clearance space, it will be ignited spontaneously by the heat of compression, thus causing on the downward stroke of the piston the expansion of the air due to the heat of the fuel injected, resulting in higher pressure obtaining, at any point of the stroke, than obtains in the compression stroke previously described. When piston 1 on its downward stroke reaches exhaust ports 2 and uncovers them, the products of combustion are allowed to pass out of such exhaust ports through passage 3 to the atmosphere.

One feature of my invention comprises an improved fluid pressure operated plunger device for injecting the oil into the cylinder, and for this purpose I provide a plunger adapted to be reciprocated in a chamber containing oil, and actuated by an abutment or piston subject to fluid under pressure, such as compressed air, which may be stored in a reservoir and obtained in any desired manner. Any suitable or preferred form of valve mechanism may be employed for controlling the pressure on said abutment to cause the actuation of the plunger; and if desired, a blast of air under sufficiently high pressure may also be admitted to the cylinder with the oil at the time of the opening of the induction valve, and thereby assist in atomizing the oil.

The valve mechanism for controlling the plunger abutment may be actuated in any desired manner from a moving part of the engine but is preferably operated by the engine piston itself so as to give an injection of oil at each out stroke of the piston and thereby produce a 2-cycle engine of this character. I will now describe more in detail a preferred construction embodying these features of my improvements:

Referring to Fig. 1: $A^1$ represents a reservoir for storage of high pressure air, $A^2$, reservoir for fuel oil supply, and $A^3$ a tank connected with a rotary pump in the ordinary cooling devices as applied in automobile practice for cooling the jacket water of the cylinders and compressor. Oil from tank $A^2$ passes through pipe lines $B^1$, $B^2$ and $B^3$ to the three cylinders, entering the cylinder heads as represented in Fig. 5 at 12, passing thence into chamber 13, and, if under pressure, unseating check valve 14, passing into chamber 15, and thence into port 8, and thence into chamber 9 (Fig. 4). If fuel oil tank $A^2$ is above priming valve 16, and the latter is open to the atmosphere, oil will pass by gravity into chamber 9, filling same completely before overflowing into priming valve 16. High pressure air will pass from reservoir $A^1$, say at 800 pounds per square inch, through pipes $C^1$, $C^2$ and $C^3$, into a connection with port 10 (Fig. 5), and thence into chamber 11 (Fig. 4) below piston or abutment 17. As this piston is made a loose fit in the bushing 18, this high pressure air will leak by piston 17 into chamber 19, and thus equalize the pressure in chambers 11 and 19, ports 20, 21, 22, 23 and chamber 26; then leak by piston of valve 24, into chamber 25, so that at starting 800 pounds per square inch air pressure will obtain in chambers 11 and 19, and ports 20, 21, 22, 23 and chambers 25 and 26. Water for the cooling of jackets of cylinders and air compressors is circulated through pipes $D^1$, $D^2$ and $D^3$, thence through the jackets of the air compressors through intercoolers and cylinder jackets, returning to the pump and cooling device $A^3$ from the cylinder heads of the engine by pipes $E^1$, $E^2$ and $E^3$. Assuming, therefore, that chamber 9 (Fig. 4) and passage 27 are filled with fuel oil, and priming valve 16 closed, that air pressure obtains in chambers 11 and 19, as previously described, it will be seen that check valve 28 will be seated by pressure through dotted port 29 obtaining in spring chamber 30, and also by pressure of spring 31, preventing the passage of any oil through a series of ports as 32, drilled around the circumference of the fuel induction valve proper 33 as long as practically no pressure exists in chamber 9. Assuming, now, that piston 1 (Fig. 3) rises, compressing air as previously described, until it nearly reaches the end of the stroke: Pin 34, mounted on piston 1, will engage stem 35 of valve 24 (Fig. 4), and as the piston 1 passes the dead center, pin 34 (Fig. 3) will cause stem 35 of valve 24 (Fig. 4) to rise, unseating valve 24 against the tension of spring 36, and the pressure obtaining in chambers 25 and 26.

Having assumed a pressure of 800 pounds in chamber 26 and its connections through the ports as described above, and that the pressure resulting from the compression of air by the engine piston into the clearance space is 500 pounds per square inch, it will be apparent that the pressure in chamber 19, ports 20, 21, 22 and 23, and chamber 26, will equalize with the pressure in cylinder 4. Assuming that such equalization will take place at say 650 pounds per square inch, it is apparent that the preponderance of pressure in chamber 11 will cause piston 17 to rise, compressing spring 37 and forcing plunger 38 upward into chamber 9. If, now, controlling valve 39 (Fig. 5) has blanked the ports in controlling valve seat 40, and check valve 14 be seated, the rising of plunger 38 into cavity 9 will cause fuel oil to flow through passage 27, unseating check valve 28 against the pressure in cavity 30, and the tension of spring 31, thus allowing oil to be forced from chamber 9 through ports 32 into chamber 11. Fuel valve 33 also being opened by the rising of piston 17, will allow air from chamber 11 and its connection to air tank A¹ through port 10 and pipe connection C³, to flow into cylinder 4. As air flows, therefore, from chamber 11 into cylinder clearance, it atomizes the oil forced through ports 32 into cavity 11, carrying the same with it into clearance space, and under the heat of compression, will cause such oil to ignite spontaneously. The crank having passed the dead center, piston 1 (Fig. 3) will begin to descend, causing pin 34 to disengage stem 35 of valve 24 (Fig. 4), allowing valve 24 to seat by the tension of spring 36, and the preponderance of pressure in chambers 26 and 25. As piston 17 was caused to rise by the reduction of pressure in chamber 19, due to the opening of valve 24, it would open port 41 by piston 17 passing by the same, thus allowing air from chamber 11 to pass through port 41 into ports 20 and 21, and hence chambers 19, 25 and 26, tending to equalize pressure on either side of piston 17, especially so if valve 24 is seated. The pressure in chambers 11 and 19 therefore being equalized, spring 37 will cause fuel valve 33 to close, bringing plunger 38 with it, creating a vacuum in chamber 9, which will be filled with oil from oil supply tank A², unseating check valve 14, or passing through any opening that may then obtain, due to the relative position of controlling valve 39 on its seat 40. The tension of spring 37 is sufficient in normal closed position of fuel valve 33 to compensate for the absence of pressure in chamber 9 on plunger 38, so that fuel valve 33 will remain closed as long as the pressure in chambers 11 and 19 is equalized. Leakage of oil from chamber 9 into chamber 19, or leakage of air from chamber 19 into chamber 9, is prevented by stuffing box 42 about plunger 38.

It will be seen from the above detailed description that when the engine is operating, a fuel injection will happen with each revolution of the engine shaft, and that whenever valve 24 is unseated, exhausting into cylinder 4; if the pressure obtaining in cylinder 4 is lower than that in chamber 19, the preponderance of pressure in chamber 11 will always cause a tendency to open fuel valve 33 by raising piston 17, providing the difference in pressure in chambers 11 and 19 is sufficient to cause compression of spring 37, and the stroke of plunger 38 will be approximately constant, depending on the relative position of port 41, which becomes uncovered by the upward movement of piston 17.

In order to regulate the amount of fuel oil injected into the cylinder a governor mechanism, operating according to the speed of the engine, is provided for actuating a valve means which controls an oil passage, and this feature of my improvements preferably comprises a speed controlled valve mechanism operating in connection with the plunger and oil chamber for governing a by-pass or other outlet passage whereby the amount of oil injected through the inlet valve at each stroke of the plunger is varied according to the load or the speed of the engine. This feature of my improvement is also preferably designed to prevent the admission of oil to the engine cylinder at very low speed and when the engine is stopped, so that oil will not be wasted nor admitted to the cylinder until the heat produced by the compression is sufficient to ignite the oil.

Referring to Fig. 2, the governor spindle 43 is driven by means of beveled gears 44 and 45, the latter being fastened to engine shaft 46, and the speed of the governor spindle is the same as that of engine shaft 46, the gears 44 and 45 being of the same diameter and the same number of teeth.

In Figs. 12 and 13 is shown a loaded form of the well known centrifugal type of governor, 47 being the load, 48 and 49 the revolving balls suspended from the governor spindle 43 by means of top cap 50, links 51 and 52 engaging cam collar 53, which latter revolves with the governor balls 48 and 49 and with the spindle 43. Cam collar 53 has a vertical motion, depending on the configuration of the governor, and a rotary motion about sleeve 54, the latter having only a vertical motion, its position depending on the vertical height of cam plate 53, and consequently the displacement of governor balls 48 and 49. Connected to sleeve 54 by means of link 55 is bell crank 56, the other arm of which is shown at 57. This, in turn, is connected by rods 58, 59 and 60 (Fig. 2) to controlling valve levers 61, 62 and 63.

Referring, now, to Figs. 5, 7, 8, 9 and 10, and, for the sake of description, assuming only a one-cylinder engine: Controlling valve 39 (Figs. 9 and 10) is, when engine is at rest, seated on controlling valve seat 40, so that port 64 in controlling valve registers with port 65 in its seat, port 66 in controlling valve being blanked, as are also ports 67 and 68 in controlling valve seat. The position of controlling valve on its seat in Fig. 5 is intended to represent the condition above described, and it will be seen that when the engine is at rest, communication is established between the oil reservoil $A^2$ (Fig. 1) by means of piping $B^3$, to 12 (Fig. 5), chamber 13, through ports 65 and 64, into chamber 15; thence through port 8 into chamber 9 (Fig. 4). It will be seen, therefore, that if the governor mechanism and the engine are at rest, the controlling valve opens a port, establishing communication between chamber 9 (Fig. 4) and oil storage tank $A^2$ (Fig. 1). Assuming, now, that the engine starts to rotate in the direction of the arrow shown in Fig. 3: Governor balls 48 and 49 will therefore start to revolve at the same speed at which crank shaft 46 turns, as the speed of rotation of crank shaft 46 is increased, the centrifugal action of governor balls 48 and 49 causes weight 47 to be raised, carrying with it sleeve 54, which will cause link 55 to operate on bell crank 56, moving rods 58, 59 and 60, and imparting a rotary motion to controlling valve arms 61, 62 and 63. This will cause controlling valve 39 to rotate on its seat 40, bringing out of register, ports 64 and 65, and bringing into register, small port 66 and triangular-shaped port 67. The air pressure from high pressure reservoir $A^1$, being in communication with chamber 11 (Fig. 4), fuel injection valve 33 will open when piston 1 reaches the end of compression stroke as previously described. As pump plunger 38 (Fig. 4) rises with the opening of fuel valve 33, oil will either have to pass through passage 27, opening check valve 28 (Fig. 4), and thence through ports 32 into chamber 11, or will escape through some other opening. As the only opening other than that just described for an egress of oil is through controlling valve 39 and port 66, registering a greater or less opening with port 67, due to the relative position of controlling valve 39 on its seat 40, it will be seen that the amount of oil injected into chamber 11, and thence into cylinder 4, will be determined by the amount of opening which the position of controlling valve 39 allows as a by-pass between chamber 9 (Fig. 4) and oil supply tank $A^2$. It will also been that the higher the speed of rotation of crank shaft 46, the higher the speed of rotation of spindle 43, and consequently the greater will be the centrifugal force due to such rotation in governor balls 48 and 49, and consequently a greater displacement or rotation of controlling valve 39 on its seat 40. The limits of such rotation have, in the accompanying drawings, been fixed at 90 degrees in the controlling valve. It will be seen, therefore, that when engine is at rest, which is one extreme position, quite a large port opening is effected between chambers 9 and $A^2$, so that the first opening of fuel valve 33 will not cause an injection of oil into the cylinder. After a slight rotation of the controlling valve, however, so as to blank ports 64 and 65, a movement of pump plunger 38 (Fig. 4) will then cause all oil pumped, due to the displacement of plunger 38, to pass into the cylinder 4. A further rotation of valve 39 on its seat will allow some oil pumped by plunger 38 to by-pass into fuel oil tank $A^2$. It will also be seen that on return of plunger 38, after having made an upward stroke, it will create a vacuum in chamber 9, which will cause check valve 14 (Fig. 5) to unseat, allowing oil to flow in from fuel oil tank $A^2$, filling the void caused by the downward displacement of plunger 38 in chamber 9. It will therefore be seen that the governor mechanism causes an automatic control of the engine speed, for, should the engine be designed to operate at the rate of 225 revolutions a minute, and should the amount of work required of the engine be less than normal, it is apparent that with a constant fuel injection into the cylinder, the speed would increase slightly, causing the governor balls to rise, which, in turn, will rotate controlling valve 39 on its seat, registering a larger opening between ports 66 and 67, and giving, therefore, a larger by-pass area, which will cause less oil to be injected into the cylinder on the next upward stroke of plunger 38, and more oil to be by-passed into the fuel oil supply tank $A^2$. On the other hand, should the load on the engine increase, the speed for a given oil injection would diminish, the governor balls would fall, controlling valve would move in the opposite direction from that previously described, restricting the by-pass between ports 66 and 67, so that on the next stroke of pump plunger 38 more oil would be forced into cylinder 4. It is thus apparent that the change in area of the by-pass port controlled by the controlling valve will regulate the amount of oil injection to give the desired speed for which the governor is designed.

The feature of my invention relating to the automatic starting device comprises in connection with a source of fluid pressure, such as a reservoir of compressed air, a valve mechanism, and a gear therefor operated by the engine for opening communication from the source of fluid pressure to the engine cylinder when the engine is at rest and the fluid pressure is turned on. This feature relates more particularly to an engine having a plurality of cylinders such as two, three or more, and any suitable form of valve mechanism and gear may be employed for this purpose. A preferred construction of this character may comprise a cam plate driven from a connection with the engine shaft and adapted to operate a plurality of plungers, corresponding to the number of engine cylinders, to open the respective fluid pressure admission valves at the proper periods in the rotation of the shaft.

For the purpose of reversing the direction of rotation of the engine having a plurality of cylinders, a manually operated device may be employed for adjusting the valve gear or mechanism of the starting device whereby the initial admission of fluid pressure may be made to one cylinder for starting the engine in one direction or to another cylinder for starting the engine in the opposite direction. I prefer to combine the automatic starting and reversing mechanism with the fuel and air admission valve device whereby the same supply or admission valve may be employed for both purposes; and also with the speed governor device so that when the engine has started and attained a certain speed, the starting valve mechanism will be cut out of operation. I will now describe more in detail the specific form of this mechanism illustrated in the drawings: To effect the automatic starting of the engine it is only necessary to turn on the air supply to chamber 11 (Fig. 4) from the supply tank A¹ (Fig. 1). It is assumed that high pressure is always obtainable from this source by storage of air previously compressed by the operation of the engine. As previously described, this high pressure air obtains in chamber 25 (Fig. 4) below pin valve 69 (Figs. 4 and 11), which is held to its seat in cap 70 not only by the pressure obtaining in chamber 25, but also by spring 36. Pin valve 69 is designed to be opened by the impingement of bell crank 71 after compressing spring 72. It will be seen from Fig. 2 that bell cranks 71 of the respective cylinders are connected by means of rods to bell cranks 72, 73 and 74 (Figs. 12 and 13), and that the face of bell cranks 72, 73 and 74 carry cam blocks 75, 76 and 77 (Fig. 16). These cam blocks in turn carry tubular plungers 82, 78 and 83 respectively, and the corresponding central plungers 84, 79 and 85, see Figs. 13, 14, 19 and 20. Cam plate 53 has cams 80 and 81 on its lower surface, the former being composed of a double ridge and the latter of a single ridge, cam 80 extending farther downward than cam 81, both of these cams covering an arc of 120 degrees, as shown in Fig. 14. It will be seen that when the governor is at rest, as in the drawing, that cam 80 will impinge go-ahead plunger 82, and the weight of balls 48 and 49, together with load 47 of the governor, will cause cam plate 80 to depress plunger 82, which in turn will depress cam block 77, which in turn will displace bell crank 72, and, by means of connecting rod, will operate the starting valve bell crank 71 and depress the pin valve 69 on the last cylinder away from the governor, as shown in Fig. 2; whereas, the starting valve mechanism on the other two cylinders is not disturbed. On opening pin valve 69, connection is established to the atmosphere from chamber 25 (Fig. 4), thus exhausting the air above valve 24, which will cause it to rise by the preponderance of pressure in chamber 26, thereby compressing spring 36.

The opening of valve 24, as previously described, causes the opening of fuel injection valve 33, allowing high pressure air to flow from cavity 11 into cylinder 4; oil, however, is not injected under the conditions of starting, for the reasons previously described, that controlling valve 39 registers in the lowest position of governor balls 48 and 49 at ports 64 and 65. It will be seen that as governor spindle 43 begins to rotate at the same speed as crank shaft 46, and if cam plate 53 is so placed in construction that plungers 78, 82 and 83 (Fig. 13) are alternately engaged by cam 80 at the time cranks 86, 87 and 88 are respectively on their top dead center, it will be apparent that under this condition high pressure air will be injected into the three cylinders alternately, as is required to keep the engine running. As the engine starts to obtain speed, however, governor balls 48 and 49 diverge and carry cam plate 53 upward, thus disengaging cam 80 from plungers 78, 82 and 83. Controlling valve is so designed that when the speed of the engine reaches such a point that the governor raises cam plate 53 sufficiently to disengage cam 80 with the plungers, then the opening of fuel valve 33 will cause oil to be injected into the cylinder by the blanking of ports 64 and 65 in the controlling valve. On the injection, therefore, of any fuel into the cylinder after a compression stroke as described, it will be spontaneously ignited, and do work on the out stroke of the piston, so that on the initial starting of the engine the high pressure air reservoir A¹ is drawn on for sufficient air to cause say one revolution of the engine, which will give a compression stroke, and sufficient speed to cause governor to disengage by the raising of cam plate 53 and cam 80 from plungers 78, 82 and 83, and after the first injection of fuel the engine will gain speed until the governor is distorted to allow sufficient by-pass through the controlling valve to inject the proper amount of fuel into the cylinders to keep the speed constant. It will therefore be seen that the engine is self starting, provided high pressure air is kept in storage in air tank A¹, and that all that is necessary to be done is to open valve from tank A¹ into pipe line C¹, C² and C³, and the engine starts automatically, and automatically changes from the starting by air pressure to continual operation by the use of fuel from fuel oil tank A². If it is desired to run the engine in the opposite direction, reversing handle 89 (Fig. 12) is raised, and sleeve 90 revolved through a small angle sufficiently to allow plungers 78, 82 and 83 to slide into the recess 91 (Fig. 18) of cam blocks 76, 77 and 75 respectively, at the same time bringing plungers 79, 84 and 85 from the recess 92 onto the elevation 93. The movement, therefore, of reversing lever 89 simply slides the cam blocks under plungers, allowing either the go-ahead plungers to occupy the higher position, while the reversing plungers are in the recesses, or vice versa, depending on which direction it is desired to have the engine run. In reversing, of course, cam 80 is taken out of commission, and cam 81 then operates the governor mechanism, revolving in the opposite direction, as will be apparent from the method of imparting motion to the governor spindle 43 from crank shaft 46.

From the above description it will be seen that the engine is not limited to the construction of three cylinders, but may have three, four, five, six, or any number, and retain the automatic starting features described; that such construction gives an engine which will start automatically and run in either direction at the will of the operator, and automatically change from the starting by air pressure to continual operation on fuel oil, without the necessity of any cam shafts to operate the valves, and with a complete absence of the ignition devices, as the fuel is ignited spontaneously, due to the heat of compression; that from using a high initial compression, high efficiency is obtained, and it is possible to use various forms of fuel, as, for instance, gasolene, kerosene or crude petroleum; that an automatic control of the speed is obtained between no load and full load, giving, with the form of governor described, a constant speed. By the substitution of spring governor, the control of the tension of the spring being in the hands of the operator, it is possible to operate the engine on a similar cycle and in a similar manner, at variable speed.

Figs. 22, 23 and 24 show a means of control by such a spring governor as referred to above, in which 48 and 49 are the revolving balls, supported on bell crank arms 51 and 52, and turned by governor spindle 43. By the compression of the spring 115, accomplished through the operation of rod 121, operating bell crank 116, the amount of load on bell cranks 51 and 52 is increased if spring 115 is compressed and with such increased load the speed of rotation of spindle 43 is increased to cause a similar divergence of balls 48 and 49 as obtains with a lighter load due to a less compression of the spring. As the governor balls 48 and 49 diverge, bell cranks 51 and 52 cause cam plate and sleeve 54 to rise by means of pin connection 118, and in other respects the operation of the spring governor above described is similar to the operation of the loaded governor.

Having now described my invention, what I claim as new and desire to secure by Letters Patent, is:—

1. A starting device for internal combustion engines, comprising a source of fluid pressure, admission valves for controlling communication from said source of fluid pressure to the engine cylinder, and means operated by the engine for automatically opening one of said valves when the engine stops and for successively opening all of the valves when the engine starts.

2. In an internal combustion engine, the combination with a plurality of engine cylinders, of an automatic starting device therefor, comprising independent valves for the respective cylinders, and a speed governed mechanism for controlling the operation of the valves to successively open them.

3. In an internal combustion engine, the combination with a plurality of engine cylinders of an automatic starting device therefor, comprising an air admission valve for each cylinder to be independently and successively operated, and a speed governing mechanism for releasing the automatic starting device to throw it out of operation after the engine begins to run.

4. In an internal combustion engine, the combination with a plurality of cylinders, of an automatic starting device comprising a source of fluid pressure, valve means for controlling the admission of fluid from said source to each cylinder, a mechanism operated by the engine for effecting the opening of one of said valves for the initial admission of fluid under pressure, and a speed governed means for cutting said starting device out of operation when the engine speeds up.

5. In an internal combustion engine, the combination with a plurality of cylinders, of an automatic starting device comprising a source of fluid pressure, a main admission valve for each cylinder, and means operating when the engine is stopped to effect the opening of one of the main admission valves.

6. In an internal combustion engine, the combination with a plurality of cylinders, of an automatic starting device comprising a source of fluid pressure, a main admission valve for each cylinder, an abutment for actuating said valve, auxiliary valve means operated by the engine for controlling the pressure acting on the abutment, and speed governed means for cutting said auxiliary valve device out of action when the engine speeds up.

7. In an internal combustion engine, the combination with a plurality of cylinders, of an automatic starting device comprising a source of fluid pressure, a main admission valve for each cylinder, an abutment for actuating said valve, auxiliary valve means for controlling the pressure acting on the main valve abutment, a selective mechanism operated by the movement of the engine for actuating the auxiliary valve of one of the engine cylinders when the engine is stopped.

8. In an internal combustion engine, the combination with a plurality of engine cylinders, of an automatic starting device therefor, a manually operated reversing mechanism for adjusting the device to start the engine in either direction, and speed governed means for cutting the starting device and reversing mechanism out of action when the engine speeds up.

9. In an internal combustion engine, the combination with an engine cylinder, a fuel chamber, and a plunger for injecting the fuel, of a source of fluid pressure, an admission valve for opening and closing communication therefrom to the cylinder for starting the engine, a piston for operating both the plunger and the admission valve, one valve means operated by the engine for varying the pressure on said piston to inject the fuel and another valve mechanism for governing the pressure on said piston and means effected by the pressure to operate the admission valve of the starting device.

10. In an internal combustion engine, the combination with an engine cylinder, a fuel chamber, and a plunger for injecting the fuel, of a source of fluid pressure, an admission valve for opening and closing communication therefrom to the cylinder for starting the engine, a piston for operating both the plunger and the admission valve, one valve means operated by the engine for varying the pressure on said piston to inject the fuel and another valve mechanism for governing the pressure on said piston means effected by the pressure to operate the admission valve of the starting device, and a speed governed mechanism for cutting out of action the last named valve mechanism when the engine is running at normal speed.

11. In an internal combustion engine, the combination with an engine cylinder, a fuel chamber, and a plunger for injecting the fuel, of a source of fluid pressure, an admission valve controlling communication therefrom to the cylinder for starting the engine, a piston for operating both the plunger and the admission valve, one valve means operated by the engine for varying the pressure on said piston to inject the fuel and another valve mechanism for governing the pressure on said piston means effected by the pressure to operate the admission valve of the starting device, and a speed governed mechanism operating the last named valve mechanism and varying the amount of fuel injected into the engine cylinder.

12. In an internal combustion engine, the combination with an engine cylinder, a fuel chamber and a plunger for injecting the fuel, of a source of fluid pressure, an admission valve for the cylinder, a piston connected to said valve, a chamber in communication with the source of fluid pressure and in which the piston fits relatively loose to permit pressure to leak from one side of the piston to the other to equalize pressure in the cylinder, and means for exhausting pressure from one side of the piston to cause the preponderating pressure on the other side of the piston to unseat the valve.

13. In an internal combustion engine, the combination with an engine cylinder, a fuel chamber and a plunger for injecting the fuel, of a source of fluid pressure, an admission valve controlling communication therefrom to the cylinder for starting the engine, a piston for operating both the plunger and admission valve, a cylinder in which the piston operates loosely whereby pressure may leak past the piston to equalize on both sides thereof, means bearing against the piston to normally keep it seated, and means for exhausting pressure on the side of the piston against which the last named means bears so that the pressure on the other side of the piston will preponderate and move the piston to unseat the valve and move the plunger.

14. In an internal combustion engine, the combination with an engine cylinder, a fuel chamber and a plunger for injecting fuel, of a source of fluid pressure, an admission valve controlling communication therefrom to the cylinder for starting the engine, a piston for operating both the plunger and admission valve, and provided with means whereby equal pressure exhausts on both sides of the piston, and means controlled by an engine part for exhausting pressure on one side of the piston whereby both the valve and the plunger will be moved to admit air and fuel into the combustion chamber of the engine.

15. The combination with an engine cylinder a fuel chamber having a port to communicate with said cylinder and valve for closing said port, a plunger connected to said valve, a piston for operating both the plunger and the valve, and pressure controlled means for operating the piston.

16. The combination with a cylinder of a combustion engine and a fuel chamber having a port in communication therewith, a valve for closing communication between the fuel chamber and the cylinder, said valve adapted to be seated against the inlet to said port, a plunger having a hollow stem connected to said valve and provided with ports adjacent to the first named port, a piston for operating both the valve and the plunger, and fluid controlled means for operating the plunger to unseat the valve and move the plunger.

17. In an internal combustion engine, the combination with a cylinder and a fuel chamber, the fuel chamber being adapted to communicate with the cylinder through a port, a valve for the port, a piston connected to said valve, a cylinder in which said valve moves, and provided with means for maintaining equal pressure on both sides of the piston, a second chamber in ported communication with the fuel chamber, and means in the second chamber to be actuated by part of the engine to exhaust pressure from one side of the piston whereby the valve will be unseated.

18. In an internal combustion engine, the combination with a plurality of engine cylinders, of fuel admitting ports, means for controlling the effective area of said ports, air admitting ports to be opened when the fuel admitting ports are closed, valves for opening and closing said ports, and a speed responsive device for closing the fuel ports when the air ports are opened.

In testimony whereof I have hereunto set my hand.

HERBERT T. HERR.

Witnesses:
 ARTHUR T. HERR,
 EDWARD A. BISHOP.